Figure 1:
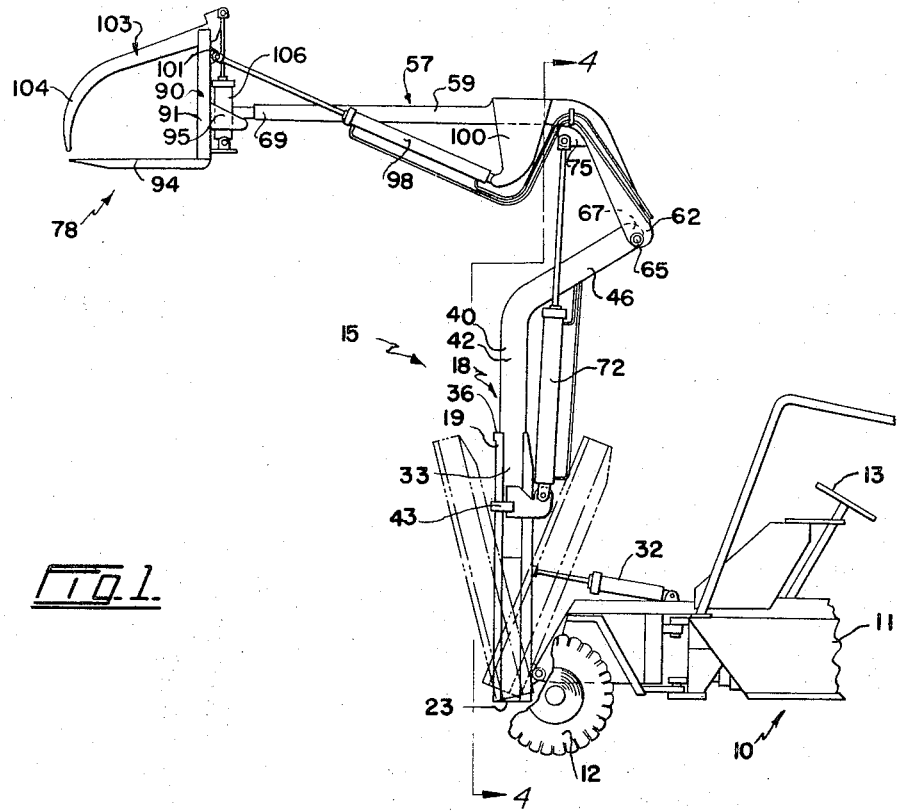

Aug. 29, 1967  H. C. ARMENEAU ET AL  3,338,442
LOADING APPARATUS

Filed Aug. 16, 1965  2 Sheets-Sheet 1

INVENTORS
HAROLD C. ARMENEAU
JOSEPH A. LITTLE
BY
Fetherstonhaugh & Co.
ATTORNEYS Aug. 29, 1967  H. C. ARMENEAU ETAL  3,338,442
LOADING APPARATUS
Filed Aug. 16, 1965  2 Sheets-Sheet 2

INVENTORS
HAROLD G. ARMENEAU
JOSEPH A. LITTLE
BY
Featherstonhaugh & Co.
ATTORNEYS 3,338,442
LOADING APPARATUS
Harold C. Armeneau and Joseph A. Little, Kelowna, British Columbia, Canada, assignors to Kelowna Machine Works Ltd., Kelowna, British Columbia, Canada, a corporation of British Columbia
Filed Aug. 16, 1965, Ser. No. 479,763
6 Claims. (Cl. 214—767)

This invention relates to loading apparatus and particularly to such apparatus which may be mounted on a vehicle, such as a tractor or the like, for handling material in the nature of logs, lumber and other similar bulky and heavy articles.

It is appreciated that many and varied types of loading apparatus has heretofore been designed and constructed. Some of such devices utilize a pivotally mounted mast having a fork or shovel or other load engaging means slidably secured thereto for vertical movement. The operation of this type of loading apparatus necessitates the moving of the tractor to which it is attached towards or away from the load in order to reach or release the load. This type of apparatus therefore imposes problems where the footing for the tractor is rough or where, due to the presence of water or soft soil, it is impossible for the tractor to get close enough to the material to be handled in order that it may be engaged by the load engaging means.

Other types of loading apparatus which employ an extensible boom having the load engaging means on the free end thereof by which the latter may be extended away from the tractor in order to pick up the load, have been devised. However, in this type of apparatus difficulties are encountered in the transportation of the load, the weight of the load being carried adversely affecting the balance of the tractor.

The present invention provides a loading apparatus which may be operated to have a relatively long reach, that is, the load engaging means may be extended from a position forwardly and remote therefrom, yet which, when the load is engaged, may be operated to place the centre of the load over the tractor frame so as not to materially affect the balance of the tractor when the load is to be transported.

The present invention also provides a loading apparatus, the successful operation of which is not at all affected by the roughness or inclination of the ground upon which the tractor is to be located.

The present invention comprises a telescopically extensible mast pivotally connected at a lower end to the frame of a tractor for pivotal movement in a fore and aft direction from a vertical position, a boom pivotally connected at one end to the upper end of the mast for pivotal movement in a central plane forwardly of the mast, load carrying means pivotally connected to the other end of the boom for pivotal movement in a vertical plane, and hydraulic actuating means connecting the mast, boom and load carrying means independently operable to effect independent movements of each of the latter.

Figure 2:
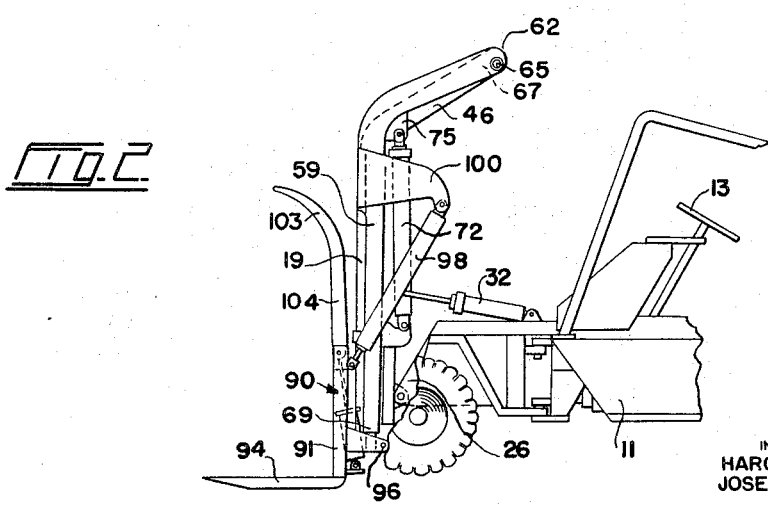
Figure 3:
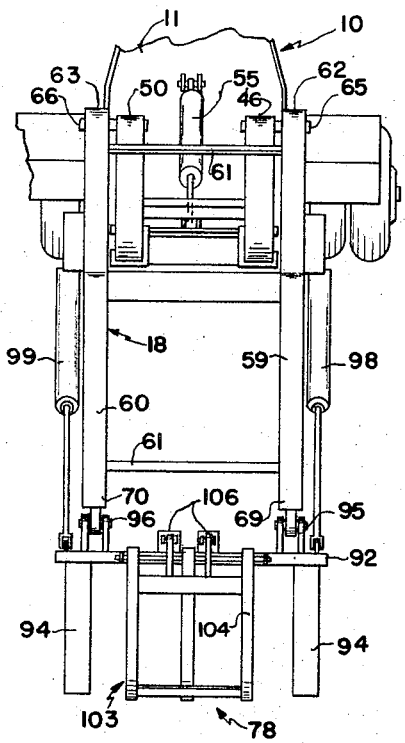
Figure 4:
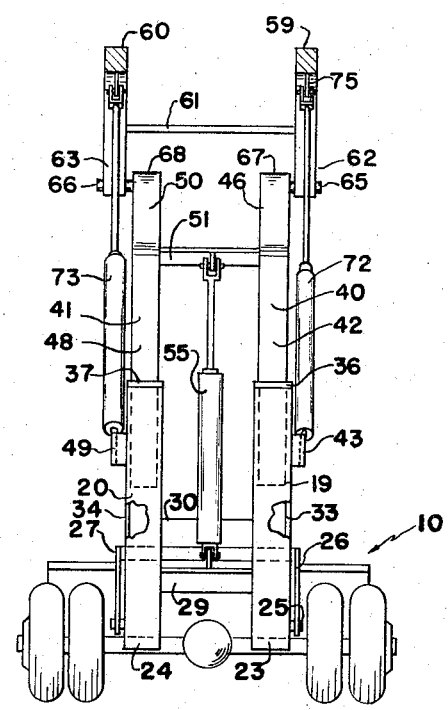

In the drawings which illustrate the invention,

FIGURE 1 is a side view of the loading apparatus secured to the front end of a tractor, the loading apparatus being shown in a position in which the load engaging means is elevated, FIGURE 2 is a side elevation of the apparatus of FIGURE 1 with the load engaging means positioned directly in front of the tractor adjacent the ground surface, FIGURE 3 is a plan view of the apparatus, showing the latter in the position of FIGURE 1, and FIGURE 4 is a section of the apparatus taken along line 4—4 of FIGURE 1.

Referring to the drawings, the numeral 10 represents a tractor having a main frame 11 which may be either of the articulated type to permit horizontal pivotal movements of its parts so as to effect steering or which may be of the unitary type with movable front wheels, the latter being indicated by the numeral 12. The tractor 10 is usually driven from a position somewhat centrally thereof by a steering wheel 13.

The loading apparatus here generally afforded the numeral 15 is secured at the front end of the main frame and comprises the telescopically extensible mast 18, formed of a pair of elongated tubular sleeves 19 and 20, each of them being pivotally mounted at their lower ends 23 and 24, respectively, on a shaft 25, the latter being supported in spaced brackets 26 and 27 secured to the front end of the main frame 11. The sleeves 19 and 20 are fixedly maintained in spaced parallel relationship by the provision of supporting webs 29 and 30 extending between them and secured as by welding to aid in the rigidity of the connected sleeves.

A hydraulically actuated piston and cylinder assembly 32 is pivotally connected between the main frame and supporting web 30 being of sufficient size that when actuated will pivotally move the sleeves from a vertical position, as shown in solid lines in FIGURE 1, in fore and aft directions to inclined positions as shown in dotted lines on said figure, said piston and cylinder assembly 32 being connected in a known manner to a hydraulic pump and reservoir, not shown, with which the tractor is provided and controlled also in a known manner by an individual control, also not shown, said control being suitably positioned for ease of operation by the operator.

The sleeves 19 and 20 may be of box-type or cylindrical construction and each is provided with longitudinally formed slots 33 and 34, respectively, extending from their lower ends 23–24 to their upper ends herein numbered 36 and 37, respectively.

The sleeves 19 and 20 form the lower section of the mast 18. The upper section comprises a pair of parallel shafts 40 and 41. Shaft 40 is formed having a lower straight elongated portion 42 of somewhat the same length as sleeve 19 and adapted to be slidably embraced by the latter, said elongated portion 42 having a laterally extending plate-like bracket 43 secured at its lower end and which, when said lower portion is slidably engaged with the sleeve 19, slidably extends from the slot 33. The upper end portion 46 of shaft 40 is bent away from the longitudinal axis of the lower portion 42 in an after direction, said upper portion 46 being long enough so that when sleeve 19 is in a vertical position, said portion 46 will extend a short distance over the front end of the main frame 11 of the tractor.

Shaft 41 is formed in the same manner as shaft 40 having a lower elongated portion 46 corresponding to the portion 42 of shaft 40 which is arranged to be slidably embraced by the sleeve 20, said lower elongated portion having a bracket 49 at its lower end and a laterally extending upper portion 50 shaped in the same form as the upper portion 46 of shaft 40. Both shafts 40 and 41 are maintained in rigid parallel alignment by means of a transversely extending brace 51 extending between them at the juncture of their lower portions 42 and 48 and their upper portions 46 and 50.

The mast 18 is telescopically extended or retracted by means of a hydraulically actuated piston and cylinder assembly 55 which extends between and is secured to support 29 and brace 51, this piston and cylinder assembly being operated through conduits, not shown, from the same source of hydraulic fluid as piston and cylinder assembly 32, the operating controls being independent of the operating controls governing the operation of the piston and cylinder 32, but located near the operator.

The mast 18 pivotally carries a boom 57, the latter comprising a pair of elongated arms 59 and 60 which are maintained in rigid parallel alignment by means of suitable transverse braces 61. The arms 59 and 60 are each pivotally journalled at their ends 62 and 63 respectively, on pintles 65 and 66 which extend outwardly and in opposite directions from the upper ends 67 and 68 of the shafts 40 and 41, respectively, the pivotal connection permitting the arms 59 and 60 to pivot on the pintles from a position as shown in FIGURE 2 in which said arms extend downwardly so as to lie adjacent to and parallel to the shafts 40 and 41 to a position in which said arms extend upwardly and forwardly away from the tractor to a position substantially as shown in FIGURE 1 of the drawings.

It is preferred that the arms, relative their longitudinal axes, conform to the shape of the shafts 40 and 41 and that they be of sufficient length so that when the said shafts are retracted to their fullest extent into the sleeves 19 and 20, the outer ends 69 and 70, respectively, of said arms 59 and 60 extend below the lower ends 23 and 24 of said sleeves. The pivotal movement of the arms 59 and 60 relative to the shafts 40 and 41 is provided by means of a pair of interconnected hydraulically operated piston and cylinder assemblies 72 and 73 which are operated in the same manner as piston assemblies 32 and 55 and which are connected between the brackets 49 and brackets 75, the latter being connected to the arms 59 and 60.

To the outer ends 69 and 70 of the arms 59 and 60, is secured load engaging means whereby the material to be loaded or shifted may be securely held. Many forms of such load engaging means may be adopted, depending upon the type of material to be handled. The drawings illustrate one form of a load engaging means which is in the nature of a fork 78.

The fork in its preferred form has a rectangularly shaped vertically arranged supporting frame 90 formed of horizontal and transverse members 91 and 92, respectively, suitably welded together so as to be rigid. Extending from a lowermost of one of said transverse members 92 are a plurality of flat tines 94. The fork 78 is pivotally secured for pivotal movement in a vertical plane to the outer ends 69 and 70 of the arms 59 and 60, respectively, one of the transverse members 92 being provided with a pair of spaced brackets 95 between which each of said outer ends 69 and 70 are pivotally secured on pins 96. The fork 78 is arranged to be pivotally operable, independently of any of the other movable members of the apparatus, by means of a pair of piston and cylinder assemblies 98 and 99 which extend between brackets 100 and 101, respectively, which are secured to the arms 59 and 60, respectively, and the upper edge of the supporting frame 90. The piston and cylinder assemblies 98 and 99 are operably connected for simultaneous operation by conduits, not shown, to the hydraulic pump on the tractor and are also provided with a separate control, whereby the fork may be pivotally moved independently of the other movable parts of the apparatus.

The fork 78 may also be provided with a clamp 103, said clamp comprising one or more elongated arms 104 pivotally mounted on the upper edge of the fork supporting frame 90 and pivotally movable by means of a piston and cylinder assembly 106 extending between said supporting frame and the arms 104, said piston and cylinder assembly 106 being independently operated in the manner hereinbefore described as piston and cylinder assembly 55.

It will be observed that the tilting of the mast, the extension of the mast, the movements of the boom, and the movements of the fork are independently controlled. The loading apparatus therefore is highly articulate and is capable therefore of being moved into an infinite number of positions depending upon the size, general shape, weight and height above ground of the load to be carried.

In the operation of the apparatus, if the surface of the ground near the load to be lifted is uneven or boggy, the tractor may be situated on relatively firm ground, the mast moved to its fully extended position and tilted forwardly. At the same time, the boom may be extended forwardly to the height desired and the forks slipped under the load. Without lifting the load, the mast may then be tilted backwardly so that it extends at an angle over the bed of the tractor, and the fork moved adjacent the front end of the tractor by moving the boom adjacent the mast. All these latter movements may be done consecutively or simultaneously by reason of the independently controlled piston and cylinder assemblies. Where the load to be carried is to be moved a considerable distance, the loading apparatus is generally positioned in a position as shown in FIGURE 2 so that the load is at its lowest point. However, where the load is extremely heavy, its centre of gravity may be shifted relative to the tractor by tilting the mast rearwardly and extending it, thereby moving the fork upwardly along the mast and rearwardly over the wheels of the tractor.

It will be seen, therefore, that the loading apparatus herein described is extremely versatile, being provided with an exceptionally long reach and yet which, when carrying a load, is capable of positioning the latter so that it has little, if any, effect on tractor's balance. The heaviest loads, therefore, may be transported at high speed and in relative safety.

What we claim as our invention is:

1. Loading apparatus for tractors comprising a mast formed of upper and lower telescopically extensible and retractable sections pivotally connected at its lower end to the frame of a tractor for pivotal movement in a fore and aft direction, said upper section being bent laterally and rearwardly adjacent its upper end so as to have a rearwardly extending upper end portion, a hydraulic piston and cylinder assembly connected between the upper and lower sections to selectively position the latter in selected positions between their telescopically-retracted and telescopically-extended positions, a hydraulic piston and cylinder tilting assembly connecting the lower section of the mast and the frame of the tractor and operable independently of the operation of the first-mentioned assembly to tilt the mast, so as to position said upper end portion of said upper section over the frame of the tractor when the lower section is pivotally moved aft of its vertical position, a boom pivotally connected at one end to the upper end of the upper section of the mast for pivotal movement in a vertical plane forwardly of the mast, load carrying means pivotally connected to the other end of the boom for pivotal movement in a vertical plane, and hydraulic actuating means connecting the mast, boom and load carrying means arranged to move the boom and load carrying means independently of the movements of the mast and of each other's movements.

2. Loading apparatus as claimed in claim 1 in which the hydraulic actuating means comprises at least one cylinder and piston assembly connecting the upper section of the mast and boom, and at least one piston and cylinder assembly connecting the boom and the load carrying means, said piston and cylinder assemblies being operable independently of each other.

3. Loading apparatus as claimed in claim 1 in which the boom is bent laterally and rearwardly adjacent its upper end to match the upper section of the mast.

4. Loading apparatus for tractors comprising a telescopically extensible mast pivotally connected at a lower end to the frame of a tractor for pivotal movement in a fore and aft direction on either side of a vertical position between a position extending over the frame of the tractor to a position extending forwardly therefrom, a boom pivotally connected at one end to the upper end of the mast for pivotal movement between a position beside and substantially parallel to the mast and a position extending forwardly therefrom, load carrying means connected to the other end of the boom for vertical pivotal movement, said mast when arranged in an extended position and with the boom in said substantially parallel position being longer than the boom so as to position the latter and with it the load carrying means over the frame of the tractor when said mast is moved aft of its vertical position, and individually operable hydraulic actuating means connecting the tractor and mast, the mast and boom and the boom and load carrying means for effecting independent operation of said mast, boom and load carrying means.

5. Loading apparatus for tractors comprising a mast formed of upper and lower telescopically extensible sections pivotally connected at its lower end to the frame of a tractor for pivotal movement in a fore and aft direction in either side of a vertical position between a position extending over the frame of the tractor to a position extending forwardly therefrom, a hydraulic piston and cylinder tilting assembly connecting the lower section of the mast and the frame of the tractor operable to tilt the mast fore and aft, a pivot pin extending transversely of the upper end of said upper section of said mast, a boom pivotally mounted at one end on the pivot pin for pivotal movement between a position beside and substantially parallel to the mast and a position extending forwardly therefrom, load carrying means connected to the other end of the boom for vertical pivotal movement, said mast when arranged in an extended position and with the boom in said substantially parallel position being longer than the boom so as to position the latter and with it the load carrying means over the frame of the tractor when said mast is moved aft of its vertical position, and hydraulic actuating means operably connecting the mast, boom and load carrying means for effecting movement of the boom and load carrying means independently of the movements of the mast and of the movements of each other.

6. Loading apparatus as claimed in claim 5 in which the hydraulic actuating means comprises at least one cylinder and piston assembly connecting the upper section of the mast and boom, and at least one piston and cylinder assembly connecting the boom and the load carrying means, said piston and cylinder assemblies being operable independently of each other.

References Cited

UNITED STATES PATENTS

| 1,856,082 | 2/1932 | Remde | 214—147 |
| 2,807,383 | 9/1957 | Scheltens | 214—620 X |
| 2,997,193 | 8/1961 | Dunham | 214—147 X |
| 3,045,850 | 7/1962 | Carr et al. | 214—620 |

HUGO O. SCHULZ, *Primary Examiner.*